United States Patent [19]

Pohl

[11] 4,290,481
[45] Sep. 22, 1981

[54] ELECTRONIC THERMOSTATIC CONTROL FOR A HEAT/COOL ROOM AIR CONDITIONING SYSTEM

[75] Inventor: Walter J. Pohl, Louisville, Ky.

[73] Assignee: General Electric Company, Louisville, Ky.

[21] Appl. No.: 148,090

[22] Filed: May 12, 1980

[51] Int. Cl.³ .................. F25B 29/00; F25B 13/00
[52] U.S. Cl. ...................................... 165/26; 62/160; 236/1 C
[58] Field of Search ............... 165/26, 27, 25; 62/160; 235/1 C

[56] References Cited

U.S. PATENT DOCUMENTS

| | | | |
|---|---|---|---|
| 3,377,545 | 4/1968 | Tveit | 165/26 X |
| 3,535,561 | 10/1970 | Pinckaers | 165/26 X |
| 3,725,644 | 4/1973 | Bailey | 236/1 C X |
| 4,079,331 | 3/1978 | Pinckaers et al. | 330/2 |

Primary Examiner—William E. Wayner
Attorney, Agent, or Firm—Frank P. Giacalone; Radford M. Reams

[57] ABSTRACT

An electronic thermostatic control for a heat/cool air conditioning unit and with variable temperature anticipation useful when the unit is located above or below the room's normal zone to compensate for different effects of air stratification as between heat and cool operating modes. A comparator circuit output switches the compressor on and off and a portion of the comparator output is fed back to one of the comparator inputs to effect a degree of temperature anticipation. The feedback is altered by a load impedance switch and into and out of the comparator output circuit to vary the voltage swing on the comparator output and thus to vary the feedback. The amount of alteration of the feedback is selected to achieve the desired variation of temperature anticipation between heating and cooling operating modes.

5 Claims, 4 Drawing Figures

ELECTRONIC THERMOSTATIC CONTROL FOR A HEAT/COOL ROOM AIR CONDITIONING SYSTEM

BACKGROUND

This invention relates to a thermostatic control especially adapted to a heat/cool room air conditioning system and more specifically to a control which provides variable temperature differential control for systems of this type in which the air temperature sensor is located at a position outside the room's normal comfort zone.

Zonal type room air conditioning systems that both heat and cool the room space are commercially available and are widely employed where individual room control is desired. Motels and office buildings are representative examples of such use. Typically, units of this type are mounted near the floor, for example, they may be mounted under a window in a through-the-wall configuration. It is customary to package and install these systems as a single complete unit. In some cases, the units employ a vapor compression refrigerant system for cooling purposes with electrical resistance heaters for heating purposes. In other cases, the units employ a heat pump system for both heating and cooling with supplemental resistance heaters included to assist in the heating operation on particularly cold days. These units generally also embody a thermostatic control with an air temperature sensor included in the installed unit. Although installation near the floor is a common practice, other installations may also be found such as over the door or window near the ceiling.

A disadvantage with either of these low or high installation configurations is that the temperature sensor when included within the unit is thus positioned outside the normal comfort zone of the room. That is to say, the occupants of the room most often physically sense, and are therefore made comfortable or uncomfortable by, temperature conditions that exist in approximately the middle one third of the room height. However, with either of the above-described unit installations, the temperature sensor is required to respond to temperature conditions existing outside this zone, either below or above the zone depending on the location of the air conditioning system.

With a single mode air conditioning system, for example, one that only cools the air space, the thermostatic control can be adjusted to compensate for this asymmetric location of the sensor such that desired temperatures are achieved in the comfort zone based on an assumed average temperature difference that is experienced between the comfort zone and the physical location of the temperature sensor. Such an assumption does not work in the case of a dual mode heat/cool system, however, since air temperature stratification in the room has an opposite influence on the disparity between the sensed air temperature and the actual comfort zone temperature as between the heat and cool operating modes. Thus with the temperature sensor located near the floor, the temperature sensor is influenced more readily in the cool operating mode by the heavier cool air coming from the air conditioner than it is in the heat mode by the lighter warm air. This is because the lighter warm air rises and takes longer for the accumulated warm air to reach the sensor than in the case of the heavier cool air which tends to accumulate near the floor first. This, of course, is a well-known phenomenon which can be seen to work in reverse in the case of an air conditioner mounted near the ceiling.

In a heat/cool air conditioning system employing a vapor compression refrigerant system, it is common to provide temperature control by cycling the compressor on and off, as necessary, to transfer heat into or out of the room in sufficient amounts to achieve the desired temperature level in the room. Heretofore, electromechanical sensors and control devices have been employed to achieve the appropriate cycling function. In order that the compressor not be damaged by an excessive cycling rate these controls have been provided, for example, with internal heating devices to provide a differential in the sensed temperature at which the compressor is cycled on and off. Thus a temperature range or differential is permitted in the room with the control being adjusted to compromise between, on the one hand, the amount of differential permitted without undue discomfort to the occupants and, on the other hand, the time delay between compressor on and off times required to avoid damage to the compressor or other adverse effects on its long term performance.

While devices of this type have been generally satisfactory, the advent of electronic controls makes it desirable to provide an electronic control of simple and inexpensive design that offers the functional control of compressor cycling in a heat/cool air conditioning system with the provision for the required temperature differential between on and off compressor cycle control. In particular, it is desired to provide such a control for a heat/cool room air conditioning unit having a temperature sensor located outside the room's comfort zone that varies this control temperature differential to compensate for the opposite influence that air stratification has in heat and cool operating modes on the temperature difference between the comfort zone and the location of the air temperature sensor.

SUMMARY OF THE INVENTION

Therefore, in accordance with the invention, an electronic temperature differential thermostatic control circuit is provided for a heat/cool air conditioning system of the type described having a temperature sensor positioned above or below the room comfort zone in which the control circuit comprises a comparator circuit having a pair of input terminals and an output terminal, the comparator being switchable between two output states dependent on the relative polarity of two potentials applied to the input terminal. The control circuit also includes means for applying to a first of the input terminals a reference potential representative of a setpoint temperature for the room comfort zone and means, including the temperature sensor, for applying to a second of the input terminals a variable potential representative of air temperature sensed outside the comfort zone. The control circuit further includes feedback means coupling the comparator output to one of the input terminals for establishing a temperature differential between two sensed temperatures at which switching of the comparator occurs from one state to another and back, respectively. The control circuit still further comprises means including a heat/cool mode switch for altering the effect that the feedback means has on the temperature differential between a first predetermined effect operative during the cool mode to a second predetermined effect operative during the heat, whereby the control circuit compensates for the opposite influence that air temperature stratification has in the heat and cool operating modes on the disparity between the sensed air temperature and the actual comfort zone temperature.

DETAILED DESCRIPTION OF THE PREFERRED EMBODIMENT

Figure 1:
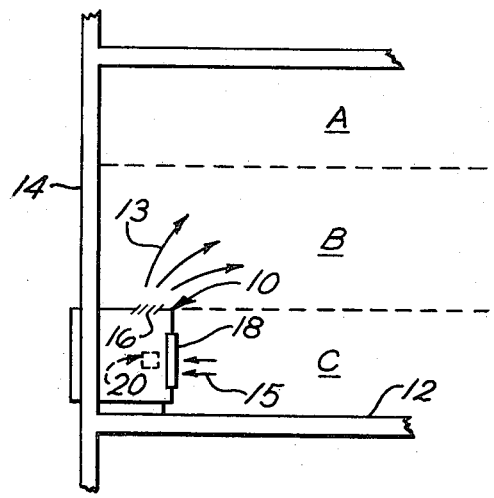
FIG. 1 is a schematic representation of a portion of a room illustrating a typical floor mounted installation of a heat/cool room air conditioning system embodying an electronic thermostatic control of the present invention.

Referring first to FIG. 1, a typical installation of a zonal type of air conditioning is shown in which the air conditioning unit 10 is mounted on or near floor 12 and extends through an exterior wall 14. As is generally customary with this type of unit, conditioned air is expelled through louvers 16 at the top of unit 10 so that the air is injected, as indicated by arrows 13, directly into roughly the middle one-third of the vertical height of the room comprising comfort zone B. Air is then returned to air conditioner 10, as indicated by arrows 15, through a filter and louver arrangement 18 which may be located on the front of unit 10. Upon entering the unit 10, the air passes a thermostatic control 20 and thus it can be seen that the control 20 is generally responsive to the air temperature that exists in a zone C which is below the comfort zone B. As previously explained, the heavier cool results in an air temperature in the lower zone C that is somewhat cooler than the temperature of the air in the middle comfort zone B while the temperature of the air in upper zone A above comfort zone B tends to be warmer than the comfort zone temperature.

In normal operation of air conditioner 10 in the cooling mode, the cool air emitted through louvers 16 tends to sink fairly rapidly into the lower zone C from when it is drawn back into unit 10 past the thermostatic control 20. Consequently, control 20 is fairly directly responsive to the cooling effect of the air conditioner with relatively little temperature anticipation required in control 20 to assume that the temperature in the comfort zone B is at the desired level. On the other hand, in the heating mode the warm air emitted through louvers 16 has a tendency to rise into upper zone A. Air conditioner 10 must continue to operate relatively longer in the heating mode until the level of accumulated warm air in the room extends down into lower zone C where it can have an effect on control 20. By this time the temperature in comfort zone B would be higher (warmer) than desired and therefore a greater degree of temperature anticipation is required in control 20. As can be seen, the inherent differential time delays caused by air stratification, as between the cooling and heating modes, results in a disparate ability of the air conditioner to maintain the temperature within comfort zone B at relatively constant desired temperature as between heat and cool modes. An improved electronic thermostatic control 20 is therefore provided in accordance with the present invention to differentially control the operation of air conditioner 10 between the heating and cooling modes to compensate for this adverse effect of air stratification.

Figure 2:
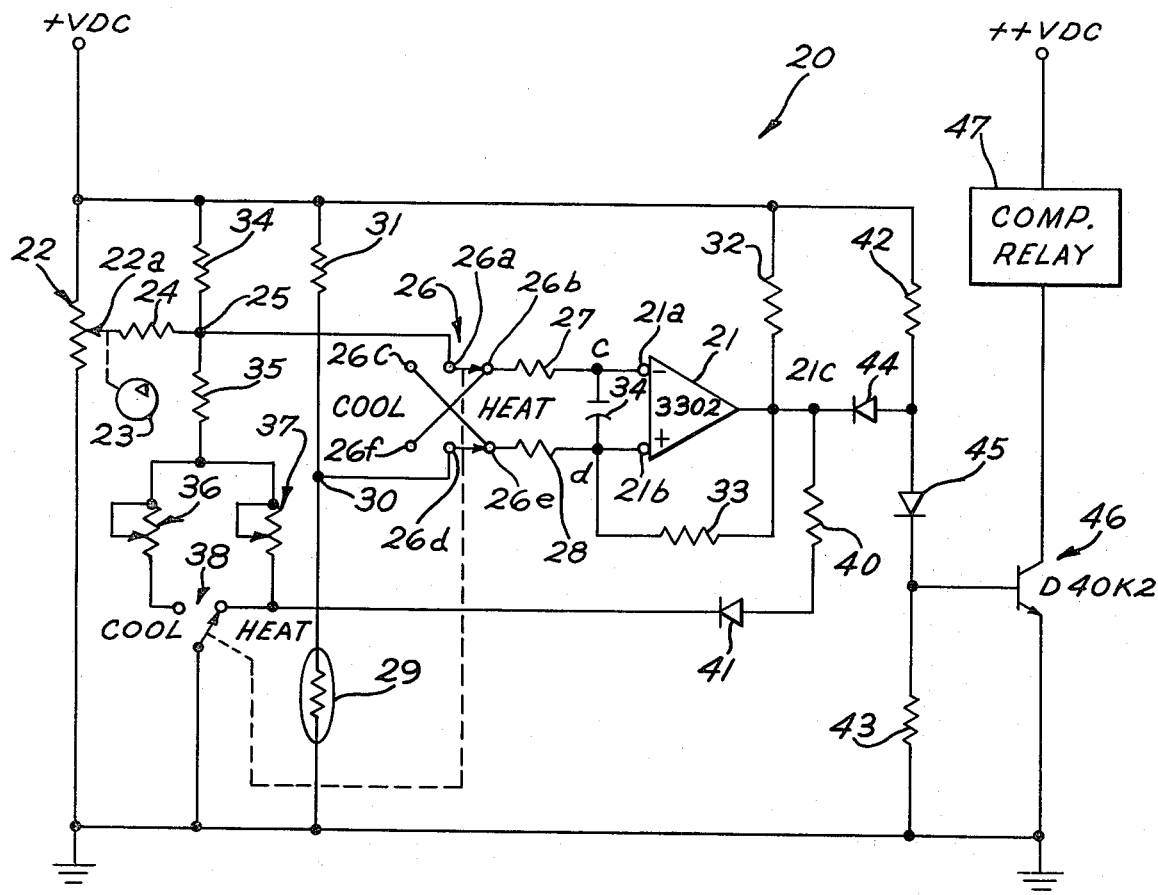
FIG. 2 is a schematic circuit diagram of an electronic thermostatic control embodying the principles of the present inventions.

Referring now to FIG. 2, an electronic thermostatic control 20 is shown which comprises, in part, a comparator circuit 21 having a pair of input terminals 21a and 21b and an output terminal 21c. Comparator circuit 21 in normal fashion is switchable between two output states dependent on the relative polarity of the two potentials applied at each of input terminals 21a and 21b. Potentiometer 22 comprises means for applying to a first of the input terminals of comparator 21 a reference potential representative of a set point temperature for the room comfort zone. The upper end of potentiometer 22 is connected to a source of positive potential such as 8 volts D.C. and the lower end is connected to ground. The movable terminal 22a is mechanically coupled to a user-operated control knob 23 and is electrically connected via resistor 24, terminal 25 and reversing switch 26 to one of the input terminals of comparator 21 the specific input terminal being dependent on the heat or cool mode setting of reversing switch 26.

Means including temperature sensor thermistor 29 is provided for applying a variable potential representative of sensed air temperature existing outside the comfort zone to another of the input terminals of comparator 21. One end of thermistor 29 is coupled to ground, while the other end is connected through resistor 31 to the aforementioned 8 VDC source to thereby form a temperature dependent variable voltage divider. An intermediate terminal 30 of this voltage divider is connected through reversing switch 26 to another one of the input terminals of comparator 21, the particular input terminal again being depending on the setting of switch 26.

An additional voltage divider circuit including resistor 34, resistor 35, and mode selection switch 38 may be coupled in series with the parallel combination of potentiometers 36 and 37 to establish upper and lower voltage limit settings at the output terminal 25 of potentiometer 22. The purpose of this arrangement is to establish upper and lower limits on the user selected set point temperature settings for energy conservation reasons, the upper limit being effective when mode switch 38 is set to the Heat contact while the lower limit being effective when switch 38 is set to the Cool contact.

Feedback means, including resistor 33 connected from comparator output terminal 21c to comparator input terminal 21b, is provided for establishing in cooperation with coupling resistor 28, a differential between two temperatures sensed by thermistor 29 at which switching of comparator 21 occurs from one state to another and back respectively. Resistor 32 serves as the pull-up resistor for comparator 21 across which appears the voltage representing the bi-stable switching states of the output of comparator 21. Thus when the voltage on terminal 21b is positive with respect to terminal 21a, no current is drawn through pull-up resistor 32 and the voltage at output terminal 21c is at the level of the positive voltage supply in this case approximately 8 volts d.c. When the potential applied to input terminal 21b is negative with respect to the potential applied to input terminal 21a, full current is drawn through pull-up resistor 32 and the potential on output terminal 21c drops to zero volts. This bi-level output signal is applied through coupling diodes 44 and 45 to control the conductive state of a Darlington connected NPN transistor 46 which in turn controls the on-off condition of compressor relay 47.

As thus far described, thermostatic control circuit 20 exhibits a single temperature anticipation of temperature differential control operation and, as such, is not able to compensate in its control action as between the heating and cooling mode for the previously described different influence that air stratification has on the temperature within lower room zone C. Thus, in accordance with a principal feature of the invention, a load resistor 40 is connected from comparator output terminal 21c to ground via a protective diode 41 and the heat contact terminal of mode switch 38 and comprises means for altering the effect that feed-back resistor 33 has on the temperature differential effective to cause state changes of comparator 21. With mode switch 38 set to the cool contact terminal, which effectively removes load resistor 40 from the circuit, the comparator output feed-back resistor 33 provides a first temperature differential effect based on essentially the entire 8 volt swing appearing at output terminal 21c. With mode switch 38 moved into contact with the heat terminal, load resistor 40 is then connected into the output circuit of comparator 21 to cause the voltage swing on terminal 21c to be limited to a value determined by the relative values of resistors 32 and 40. This reduced voltage swing at the output of comparator 21 is coupled back by feed-back resistor 33 to provide a second temperature differential effect operative during the heat mode which is effective to make the thermostatic control 20 more sensitive to variations in the sensed air temperature.

Figure 3A:
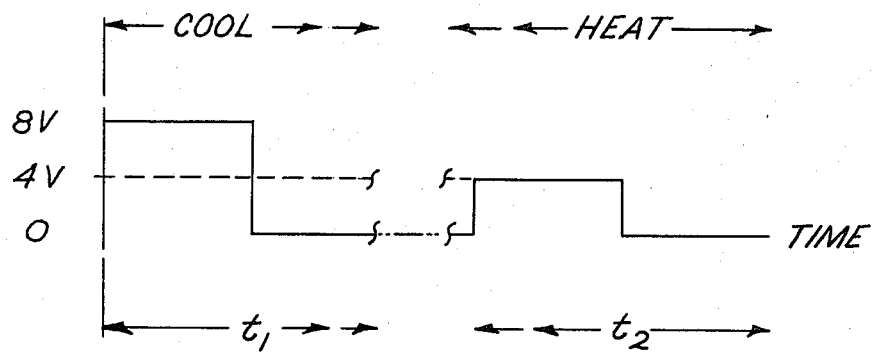
FIGS. 3a and 3b are diagrams useful in explaining the operation of the present invention.
Figure 3B:
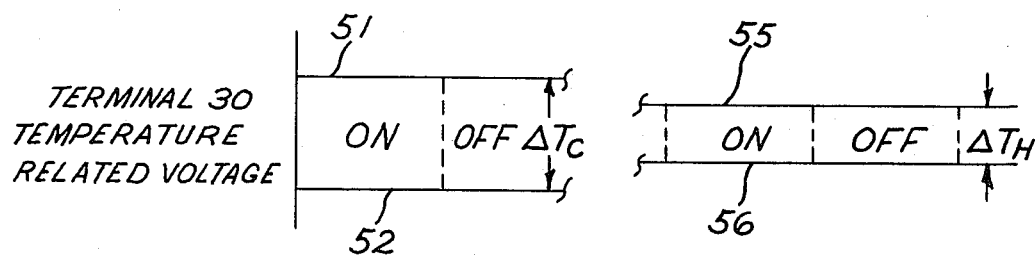

The operation of control circuit 20 may be more readily understood with reference to FIGS. 3a and 3b. In FIG. 3a curve 50 indicates the output voltage swing of 8 volts that occurs when mode switch 38 and this interconnected polarity reversal switch 26 are set to the cool mode position. In FIG. 3b the spread $T_c$ between level 51 and level 52 represents the spread in sensed air temperature that must be traversed by the voltage.

In FIG. 2, a thermostatic control circuit 20 in accordance with the invention is shown as including a comparator circuit 21 having input terminals 21a and 21b and an output terminal 21. An output load resistor 32 serving as the pull up resistor for comparator 21 is coupled between terminal 21a and a source of positive potential VDC, which may for example be 8 volts. The voltage swing across resistor 32, which results from the switching of comparator 21, is coupled through diodes 44 and 45 to the base of transistor to control current flow therethrough to operate compressor relay 47 to turn the air conditioner on and off as needed to maintain a desired room temperature level.

Potentiometer 22 is connected between ground and the 8 volt potential source and has its movable arm 22a mechanically coupled to a user operated control 23 to serve as means for providing an adjustable reference potential on arm 22a which is representative of the desired setpoint temperature to be established in the warm comfort zone. The potential on arm 22a is coupled through resistor 24 to terminal 26a of polarity reversing switch 26 and thence to one of the input terminals of comparator 21 depending on the setting of switch 26. An additional voltage divider network, including resistors 34 and 35 coupled in series with the parallel combination of potentiometers 36 and 37 and with selector switch 38, is coupled between the 8 volt supply and ground. The common terminal 25 between resistors 34 and 35 is connected to the output of potentiometer such that the network provides presettable upper and lower voltage setting limits on the output of potentiometer 22, depending on the setting of switch 38, for energy saving purposes.

A variable voltage divider network including resistor 31 and negative temperature coefficient thermistor 29 has its common terminal 30 at terminal 30 during the cool operating mode in order to cause switching of the output of comparator 21 and corresponding turn-on and turn-off of the unit compressor. On the other hand, curve 54 (FIG. 3a) indicates the lower voltage swing across resistor 32 resulting from the insertion of resistor 40 into the output circuit of comparator 21, while the narrower spread $\Delta T_H$ between voltage levels 55 and 56 (FIG. 3b) indicate the narrower voltage variation on terminal 30 which will result in switching of comparator 21 with corresponding turn-on and turn-off of the unit compressor. It will be apparent that with resistor 40 out of the circuit during cool mode operation the thermostatic control circuit 20 is less sensitive to sensed room temperature variations and with resistor 40 in the circuit during heat mode operative control circuit 20 is more sensitive to sensed room temperature variations. In this way, different temperature anticipation effects are provided which serve to maintain the temperature in the middle comfort zone B relatively constant at the desired temperature setting despite the different effects of air stratification in heating and cooling.

While, in accordance with the patent statutes, there has been described what, at present, is believed to be the preferred embodiment of the invention, it will be obvious to those skilled in the art that various changes and modifications may be made therein without departing from the invention, as for example, by changing the value of resistor 33 or resistor 28 by means of a supplemental switch. It is, therefore, intended by the appended claims to cover all such changes and modifications as fall within the true spirit and scope of the invention.

What is claimed is:

1. In a heat/cool room air conditioning system having a temperature sensor positioned above or below the comfort zone of the room space, an electronic temperature differential thermostatic control circuit operable during the heating and cooling modes of operation comprising:

a comparator circuit having a pair of input terminals and an output terminal and being switchable between two output states dependent on the relative polarity of two potentials applied to the input terminals;

means for applying to a first of the input terminals a reference potential representative of a setpoint temperature for the room comfort zone;

means including said temperature sensor for applying to the second of said input terminals a variable potential representative of sensed air temperature outside the comfort zone;

feedback means coupling the comparator output to one of the input terminals for establishing a temperature differential between two sensed temperatures at which switching of the comparator occurs from one state to another and back, respectively;

and means including a heat/cool mode switch for altering the effect that the feedback means has on the temperature differential between a first predetermined effect operative during the cool mode to a second predetermined effect operative during the heat mode;

whereby the control circuit compensates for the opposite influence that air temperature stratification has in the heat and cool operating modes on the disparity between the sensed air temperature and the actual comfort zone temperature.

2. The thermostatic control circuit of claim 1 in which the temperature sensor is located below the room comfort zone, and in which the feedback altering means is adapted to reduce the temperature differential in the heat mode as compared to the temperature differential operative during the cool mode.

3. The thermostatic control circuit of claim 1 in which the comparator output switches between one voltage level corresponding to the off condition of the air conditioning system and another voltage level corresponding to the on condition of the system, and in which the feedback altering means includes means for maintaining said on voltage level at a first value in the heat mode of the system and at a second, different value in cool mode of the system.

4. The thermostatic control circuit of claim 1 in which the feedback means is adapted to provide a first level of positive feedback to one of the comparator input terminals to establish a first temperature differential spread effective to cause switching of the comparator, and in which the feedback altering means is adapted to reduce the level of positive feedback to provide a narrower temperature differential spread between switching states of the comparator.

5. The thermostatic control circuit of claim 4 in which the temperature sensor is positioned below the comfort zone of the room, and in which the feedback altering means is operative during the heat mode to narrow the temperature differential spread.

* * * * *